United States Patent
Benini et al.

(10) Patent No.: US 10,599,912 B2
(45) Date of Patent: Mar. 24, 2020

(54) ANALYSIS OF REFLECTIONS OF PROJECTED LIGHT IN VARYING COLORS, BRIGHTNESS, PATTERNS, AND SEQUENCES FOR LIVENESS DETECTION IN BIOMETRIC SYSTEMS

(71) Applicant: AWARE, INC., Bedford, MA (US)

(72) Inventors: David Benini, Manchester, MA (US); Louis Scott Hills, Stow, MA (US); Taras Riopka, Concord, MA (US)

(73) Assignee: AWARE, INC., Bedford, MA (US)

( * ) Notice: Subject to any disclaimer, the term of this patent is extended or adjusted under 35 U.S.C. 154(b) by 0 days.

(21) Appl. No.: 15/652,485

(22) Filed: Jul. 18, 2017

(65) Prior Publication Data

US 2018/0181794 A1 Jun. 28, 2018

Related U.S. Application Data

(60) Provisional application No. 62/438,610, filed on Dec. 23, 2016.

(51) Int. Cl.
*G06K 9/00* (2006.01)

(52) U.S. Cl.
CPC ..... *G06K 9/00228* (2013.01); *G06K 9/00268* (2013.01); *G06K 9/00597* (2013.01); *G06K 9/00906* (2013.01)

(58) Field of Classification Search
None
See application file for complete search history.

(56) References Cited

U.S. PATENT DOCUMENTS

| | | | |
|---|---|---|---|
| 9,439,629 B2 * | 9/2016 | Hershey | A61B 10/0096 |
| 1,001,395 A1 | 7/2018 | Tam | |
| 10,013,952 B2 * | 7/2018 | Tam | G09G 5/10 |
| 10,049,287 B2 * | 8/2018 | Holz | G06K 9/00906 |
| 2013/0188840 A1 * | 7/2013 | Ma | G06K 9/00221 |
| | | | 382/107 |
| 2014/0079297 A1 | 3/2014 | Tadayon et al. | |
| 2014/0169642 A1 * | 6/2014 | Law | G06K 9/00899 |
| | | | 382/117 |

(Continued)

OTHER PUBLICATIONS

Smith, Daniel F. "Countering Digital Replay Attaches for Face Verification on Consumer Smart Devices Using Structured Illumination" A thesis submitted for the degree of Doctor of Philosophy at the University of Queensland; Jan. 1, 2016 (246 Pages).

(Continued)

*Primary Examiner* — David Perlman
(74) *Attorney, Agent, or Firm* — Jason H. Vick; Sheridan Ross, PC

(57) ABSTRACT

Spoofed faces are unlikely to reflect a likeness detection image in the same manner as live faces. To determine likeness of a subject face, a likeness detection image is displayed on a screen of a face recognition device in the direction of the subject face, and a reflection image of the subject face is captured while the likeness detection image is displayed. The reflection image is analyzed to determine whether the reflection image contains any reflections of the likeness detection image, and a likeness determination is made based on the location and/or character of any such reflections.

23 Claims, 8 Drawing Sheets

(56) References Cited

U.S. PATENT DOCUMENTS

| | | | | |
|---|---|---|---|---|
| 2016/0140405 A1* | 5/2016 | Graumann | ......... | G06K 9/00281 |
| | | | | 382/118 |
| 2016/0379042 A1* | 12/2016 | Bourlai | .............. | G06K 9/00288 |
| | | | | 382/118 |
| 2017/0053174 A1* | 2/2017 | Fan | .................... | G06K 9/00221 |
| 2017/0339338 A1* | 11/2017 | Gordon | .............. | G06K 9/00302 |
| 2018/0150708 A1 | 5/2018 | Martin | | |

OTHER PUBLICATIONS

International Search Report for International Application No. PCT/US2017/042499, dated Sep. 28, 2017.
Written Opinion for International Application No. PCT/US2017/042499, dated Sep. 28, 2017.
International Preliminary Report on Patentability for International Application No. PCT/US2017/042499, dated Jul. 4, 2019.

\* cited by examiner

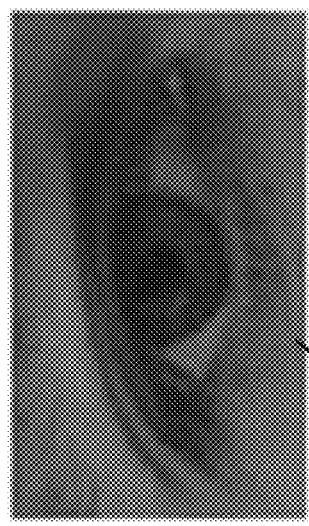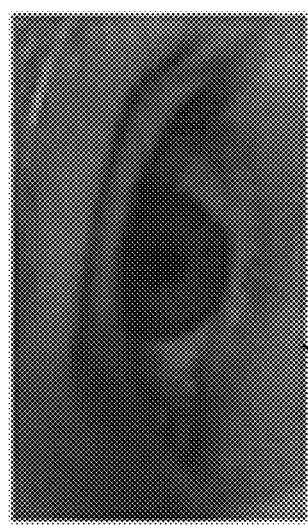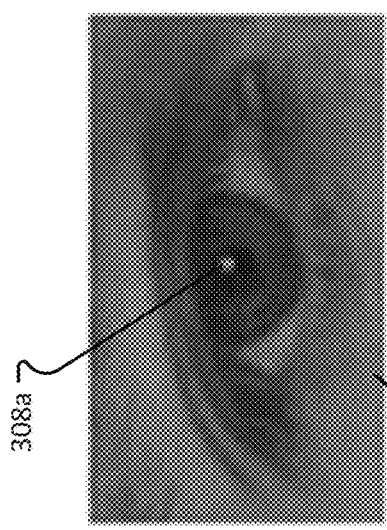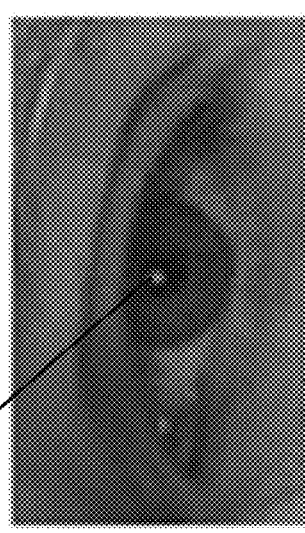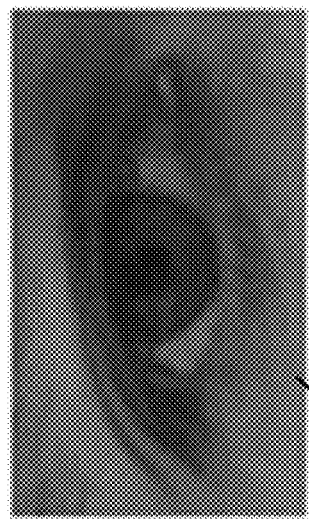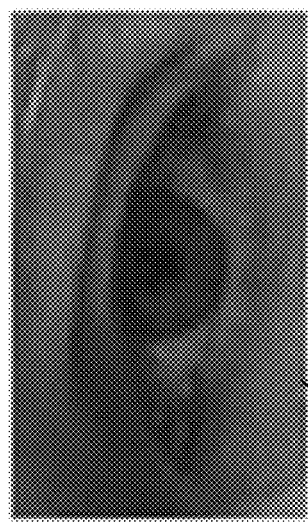
FIG. 3A
FIG. 3B

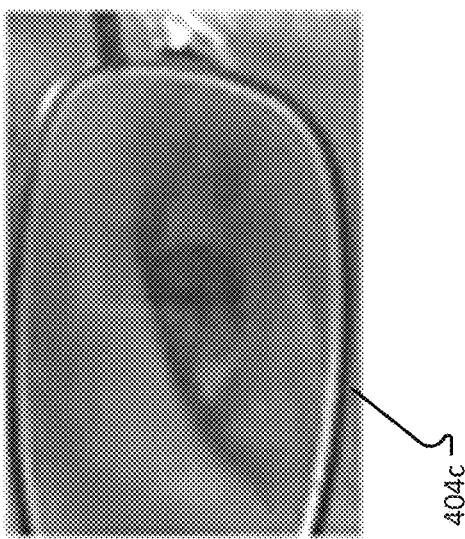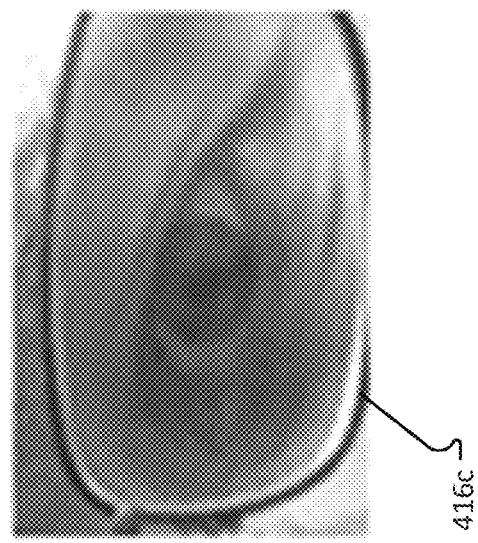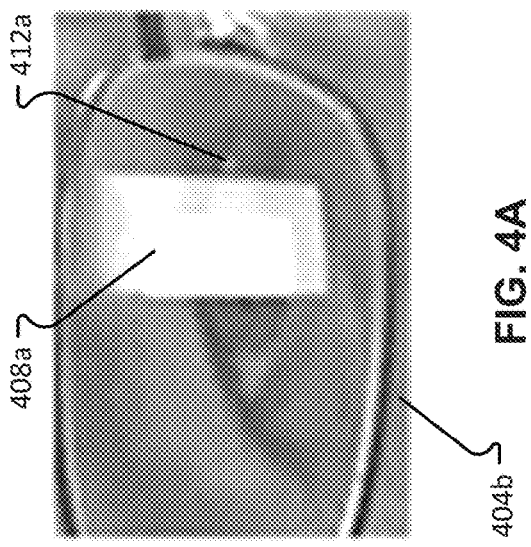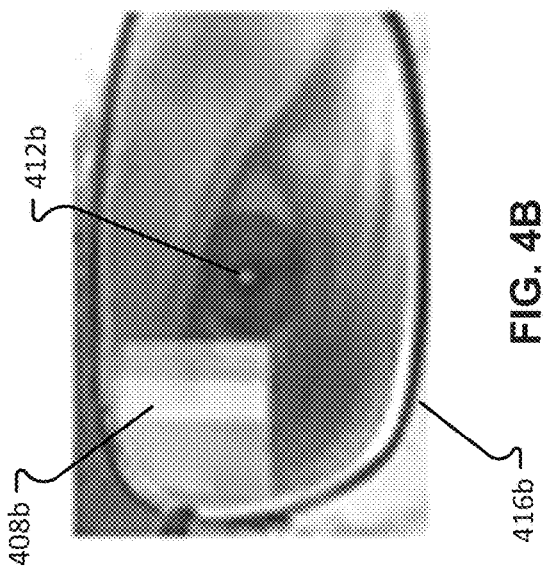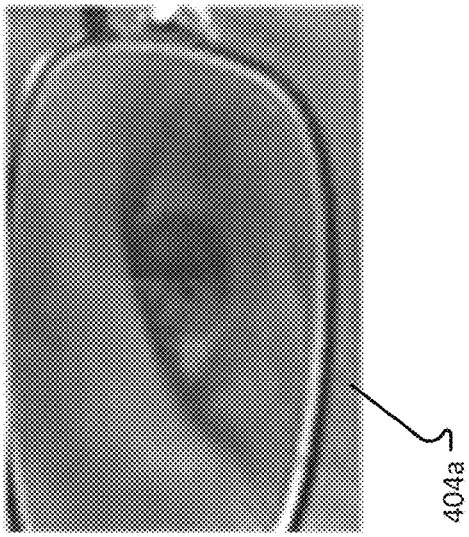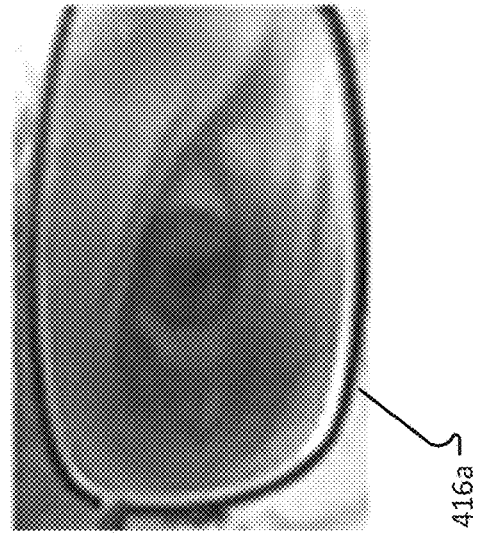
FIG. 4A
FIG. 4B

ANALYSIS OF REFLECTIONS OF PROJECTED LIGHT IN VARYING COLORS, BRIGHTNESS, PATTERNS, AND SEQUENCES FOR LIVENESS DETECTION IN BIOMETRIC SYSTEMS

RELATED APPLICATION DATA

This application claims the benefit of and, under 35 U.S. § 119(e), priority to U.S. Provisional Patent Application No. 62/438,610, filed Dec. 23, 2016, entitled "ANALYSIS OF REFLECTIONS OF PROJECTED LIGHT IN VARYING COLORS, BRIGHTNESS, PATTERNS, AND SEQUENCES FOR LIKENESS DETECTION IN BIOMETRIC SYSTEMS," which is incorporated herein by reference in its entirety.

BACKGROUND

Digital images of our face, eyes, irises, and other physical features can be used as "biometrics" to digitally verify our identity. In this way, our biometrics can be used with a computing device such as a smart phone in a way that is analogous to passwords, potentially enabling identity verification with more security and convenience than with the use of passwords. For example, a user might use his or her facial image as a biometric in place of (or in addition to) a password in order to log in to an application running on a mobile phone.

In the example of biometric identity verification using facial images, a user captures a "selfie" image of his or her face using the screen-side camera as part of an "enrollment" process. The image is analyzed to locate and quantify special features, which are then securely stored. Upon identity "verification," the process is repeated and the quantified features of the image are compared to those produced from the enrollment process. In this way, biometric capture and matching algorithms can be used to assess the likelihood that the biometric samples are derived from the same person.

In applications where biometric identity verification is used to protect sensitive or valuable information, there can be a vulnerability to "spoofing," where a "fraudster" attempts to commit a crime by impersonating their victim, such as to gain access to their online bank accounts through their mobile banking application. Such fraud attempts are referred to as "presentation attacks," where fraud is attempted by falsely presenting the identity of a victim upon verification. Such a presentation attack might be attempted by presenting a photograph or digital video of the targeted victim in place of their live image.

To address this vulnerability, biometric systems apply "spoof detection", or "likeness detection" techniques designed to detect presentation attack attempts. Many of these approaches require interaction with the user, such as by displaying commands to the user such as "blink" or "turn head". Software is used to analyze the image stream to detect the subject activity and compare it to expected behavior.

BRIEF DESCRIPTION OF THE DRAWINGS

The exemplary embodiments of the technology will be described in detail, with reference to the following figures wherein:

FIG. 3A shows images of the right eye of a live face during a face recognition analysis in accordance with some embodiments;

FIG. 3B shows images of the left eye of a live face during a face recognition analysis in accordance with some embodiments;

FIG. 4A shows images of the right eye of a live face with glasses during a face recognition analysis in accordance with some embodiments;

FIG. 4B shows images of the left eye of a live face with glasses during a face recognition analysis in accordance with some embodiments;

DETAILED DESCRIPTION

Figure 1A:
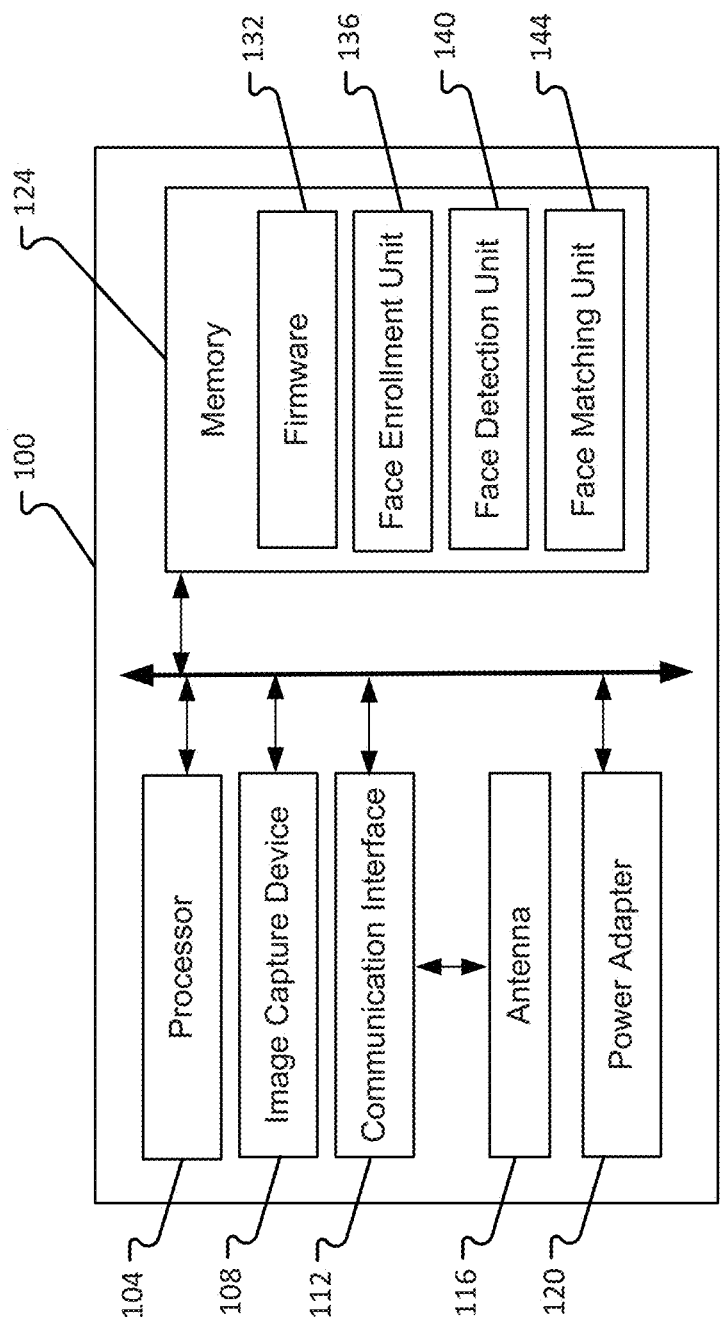
FIG. 1A shows a block diagram of a system in accordance with some embodiments.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Terminology:

Biometrics: the process of verifying or identifying individuals' identity based upon one or more intrinsic physical characteristics such as faces, fingerprints, irises, voices, etc.

Face Recognition: a process of identifying a person, or verifying a person's identity, from provided images of the person's face.

Face Recognition System: A biometric system based on face recognition. In some embodiments, a face recognition system may be integrated or otherwise interconnected with an access control system, and used to distinguish authorized users from unauthorized users by facial analysis.

Iris: The part of the eye that is generally referred to as the iris in biometric literature, but including also the pupillary zone (the inner region whose edge forms the boundary of the pupil).

Live Face: A face of a living being that may be or is presented directly to a face recognition system (as opposed to a spoofed face).

Spoof/Spoofed Face: An image of a face that may be or is presented to a face recognition system. For example, an unauthorized user may present a picture of an authorized user (a spoof) to a face recognition system in an attempt to gain illicit access to a resource protected by the system.

Spoofing Medium/Media: Any medium or media upon which a spoof is provided, including but not limited to a paper, a photo paper, a shaped board, a display monitor (e.g. a computer monitor, television, or display screen), and smart phone.

"Spoof detection" and "likeness detection" methods that require user interaction, as already known in the art, are sub-optimal in that they are less convenient for the user. In some cases, they may also be susceptible to defeat by fraudsters.

Additionally, a significant drawback of current face recognition systems is that if a spoofed face can be enrolled or pass through the face detection unit, it may be treated no differently from a live face. Once a face is detected, various image transformation methods may be applied, e.g., image rotation, resizing, grayscale conversion, noise filtering or pose correction, etc. For example, these image transformation methods may be applied to normalize the image for processing by the face recognition system. These image processing steps, however, may reduce or filter out possible spoofing features or patterns needed to differentiate live faces from spoofed faces. The challenge is, therefore, to analyze the input image and obtain useful spoofing knowledge to differentiate live faces and spoof faces in earlier stages of the enrollment or face recognition process. Some of the embodiments described herein are useful for overcoming this challenge, and may be used prior to image normalization or transformation.

An embodiment described herein applies a novel approach to likeness detection, both during enrollment and during face recognition, which is to use a screen of the device or computer conducting an enrollment or a face recognition analysis (or to use an actual projector) to display or project one or more images and colors—potentially in different patterns and sequences—onto the subject, and then to analyze the resulting reflected image. Software is used to generate various images and colors, which are displayed on the screen with sufficient brightness to cast images and colors on the face of the subject. Images of the subject are captured during this process and analyzed. Analysis of the resulting images is performed to determine whether the subject is a 3-D person, a photograph, or digital image or video, or to detect other presentation attack modes.

In one embodiment, various patterns and shapes are displayed or projected on the screen of the device or computer performing the enrollment or face recognition, while facial images of the subject are captured. These images are reflected by the iris of the user, and the resulting images are analyzed. Importantly, these reflected images will be different between a live subject and an attempted spoof, such as a paper-based photo, digital photo, or digital video of the subject.

Referring to FIG. 1A, a face recognition device or system 100 according to one embodiment of the present disclosure may comprise a processor 104, an image capture device 108, a communication interface 112 (which may or may not comprise an antenna 116), a power adapter 120, and a memory 124.

The processor 104 may correspond to one or multiple microprocessors that are contained within a housing of the device 100. The processor 104 may comprise a Central Processing Unit (CPU) on a single Integrated Circuit (IC) or a few IC chips. The processor 104 may be a multipurpose, programmable device that accepts digital data as input, processes the digital data according to instructions stored in its internal memory, and provides results as output. The processor 104 may implement sequential digital logic as it has internal memory. As with most known microprocessors, the processor 104 may operate on numbers and symbols represented in the binary numeral system. The processor 104 may be configured to execute instructions stored in the memory 124.

The image capture device 108 captures images of faces that are subsequently provided as inputs to one or more of the face enrollment unit 136, face detection unit 140, and face matching unit 144. The image capture device 108 may comprise a camera, a video camera, and/or one or more other optical sensors, and may use, for example, charge-coupled device (CCD) or complementary metal-oxide semiconductor (CMOS) image sensors, or the like. Images captured by the image capture device 108—which images may be still images or videos—may be stored in the memory 124. In addition to image sensors, the image capture device 108 may comprise one or more sensors configured to enhance the quality of images captured by the image capture device 108, such as light meters (e.g., for adjusting exposure), distance meters (e.g., for detecting distance to subject), contrast sensors (e.g., for autofocus), lighting devices (e.g., for illuminating the subject in different spectrums), and motion detectors (e.g., for triggering image capture). The image capture device 108 may be configured for continuous operation, or for periodic operation, or for on-command operation. In some embodiments, for example, the image capture device 108 may capture images only when directed to do so by the processor 104 upon execution by the processor 104 of instructions from one or more of the face enrollment unit 136, the face detection unit 140, and the face matching unit 144. Also in some embodiments, the image capture device may provide, under the control of the processor 104, a continuous video feed that is continuously monitored by the processor 104 (according to instructions executed by the processor 104 from one or more of the face enrollment unit 136, the face detection unit 140, and the face matching unit 144), and may capture and store images only at the command of the processor 104.

The face recognition device 100 may comprise a communication interface 112, which may be used, for example, to communicate with a central server and/or with the cloud. The communication interface 112 may beneficially enable the face recognition device 100 to access remote storage (e.g., for storing and/or archiving captured image information, face enrollment information, face detection information, and/or face matching information), to receive commands from a central control system (e.g. an offsite server or administrator), to access databases or other repositories of facial images for matching/recognition purposes, and/or to transmit face recognition determinations or related information (e.g. authorization/no authorization decisions) to a central database for storage and/or analysis, to an administrator, operator, or other user, and/or to an access control system or access control system component (e.g. an electrically actuated door lock).

The communication interface 112 may utilize any known wired or wireless communication protocol. Examples of wired protocols that may be utilized by the communication interface 112 include RS-232, RS-422, RS-485, I2C, SPI, IEEE 802.3, and TCP/IP. Examples of wireless protocols that may be utilized by the communication interface 112 include IEEE 802.11 protocols such as but not limited to IEEE 802.11a/b/g/n/ac/ax, Bluetooth®, Bluetooth® Low Energy (BLE), FeliCa, Zigbee®, GSM, LTE, 3G, 4G, 5G, RFID, and NFC. The communication interface 112 may comprise hardware (e.g. an Ethernet port, a wireless radio), software (e.g. drivers, firmware, applications), or a combination thereof to enable communications to and from the face recognition device 100. Where the communication interface 112 uses a wireless communication protocol, the communication interface 112 may also comprise an antenna 116 for sending and receiving signals wirelessly.

The power adapter 120 receives power (e.g., electricity) from an external source and routes the power to the various components of the face recognition device 100 as needed, while also performing power transformation and signal conditioning functions as necessary to ensure that power is provided to each component of the face recognition device 100 according to the specifications of the component in question. In some embodiments, the power adapter 120 may comprise a backup power source (e.g., one or more batteries, a generator, a solar cell) for ensuring the continuous provision of power to the face recognition device 100, even if the primary power source (which may be, for example, a public electricity grid) is interrupted. In some embodiments, the power adapter 120 may comprise a battery or other energy storage device as a primary power source, and the power adapter 120 may be configured to receive power from an external source for recharging the battery or other energy storage device.

The memory 124 may correspond to any type of non-transitory computer-readable medium. In some embodiments, the memory 124 may comprise volatile or non-volatile memory and a controller for the same. Non-limiting examples of memory 124 that may be utilized in the device 100 include RAM, ROM, buffer memory, flash memory, solid-state memory, or variants thereof.

The memory 124 stores any firmware 132 needed for allowing the processor 104 to operate and/or communicate with the various components of the face recognition device 100, as needed. The firmware 132 may also comprise drivers for one or more of the components of the device 100.

In addition, the memory 124 may store one or more modules for carrying out the various steps described herein. For example, the memory 124 may store a face enrollment unit or module 136 that contains instructions for causing the processor 104 to command the image capture device 108 to capture an image. The face enrollment unit 136 may further cause the processor 104 to analyze the image, detect a face within the image, generate a normalized face image, associate identification information (e.g. name, birthday, identification number, access privileges) with the normalized face image, and store the normalized face image and associated identification information for future reference.

As another example, the memory 124 may store a face detection unit or module 140 containing instructions that, when executed by the processor 104, allow the processor to identify one or more faces within an image captured by the image capture device 108, and to generate a normalized face image of such faces. The face detection unit 140 may, for example, be accessed by one or both of the face enrollment unit 136 and the face matching unit 144 whenever the functions of the face detection unit 140 are necessary. In some embodiments, the face detection unit 140 may cause the processor 104 to continuously monitor a continuous video feed from the image capture device 108, and may cause the processor 104 to instruct the image capture device 108 to obtain still images whenever one or more faces are detected in the continuous video feed. The face detection unit 140 may further cause the processor to generate a normalized face image of faces detected in such images, and may cause the processor 104 to activate the face matching unit 144 for analysis of such normalized face images.

The memory 124 may further store a face matching unit or module 144. The face matching unit or module 144 may be configured to analyze a normalized face image (or, in some embodiments, to first generate a normalized face image using an image obtained via the image capture device 108), including by comparing the normalized face image to known faces (e.g. faces that have been enrolled via the face enrollment unit 136, and/or faces obtained from an external database or repository via the communication interface 112). When a normalized face matches a known face, the face matching unit 144 may further be configured to transmit information about the match to an administrator, operator, or other user of the face recognition device 100 via the communication interface 112, and/or may further be configured to selectively transmit a control signal to an access control system or access control system component. For example, if a match is identified, the face matching unit 144 may check the identification information associated with the enrolled facial image that matches the identified facial image, determine whether the identification information indicates that the person associated with the enrolled facial image has access privileges, and grant or deny physical access (e.g. by controlling an electrically actuated door lock) or electronic access (e.g., by controlling whether a user is permitted to log into a mobile device, a computer, or an account) based on the determination.

In embodiments of the present disclosure, one or more of the face enrollment unit 136, the face detection unit 140, and the face matching unit 144 may be configured to conduct face likeness detection as described herein. Where each unit 136, 140, and 144 operates a stand-alone unit (e.g., without utilizing the other units to complete the face enrollment, face detection, and face matching functions), each unit 136, 140, and 144 may be configured to conduct face likeness detection. Where each unit 136, 140, and 144 has unique functions, and the three units 136, 140, and 144 operate together to provide the face enrollment, face detection, and face matching functions, only one unit 136, 140, or 144 may be configured to conduct face likeness detection. For example, the face detection unit 140 may be configured to conduct face likeness detection for each face detected in an image, prior to that face (or data corresponding thereto) being provided to the face enrollment unit and/or the face matching unit 144 for further analysis.

Figure 1B:
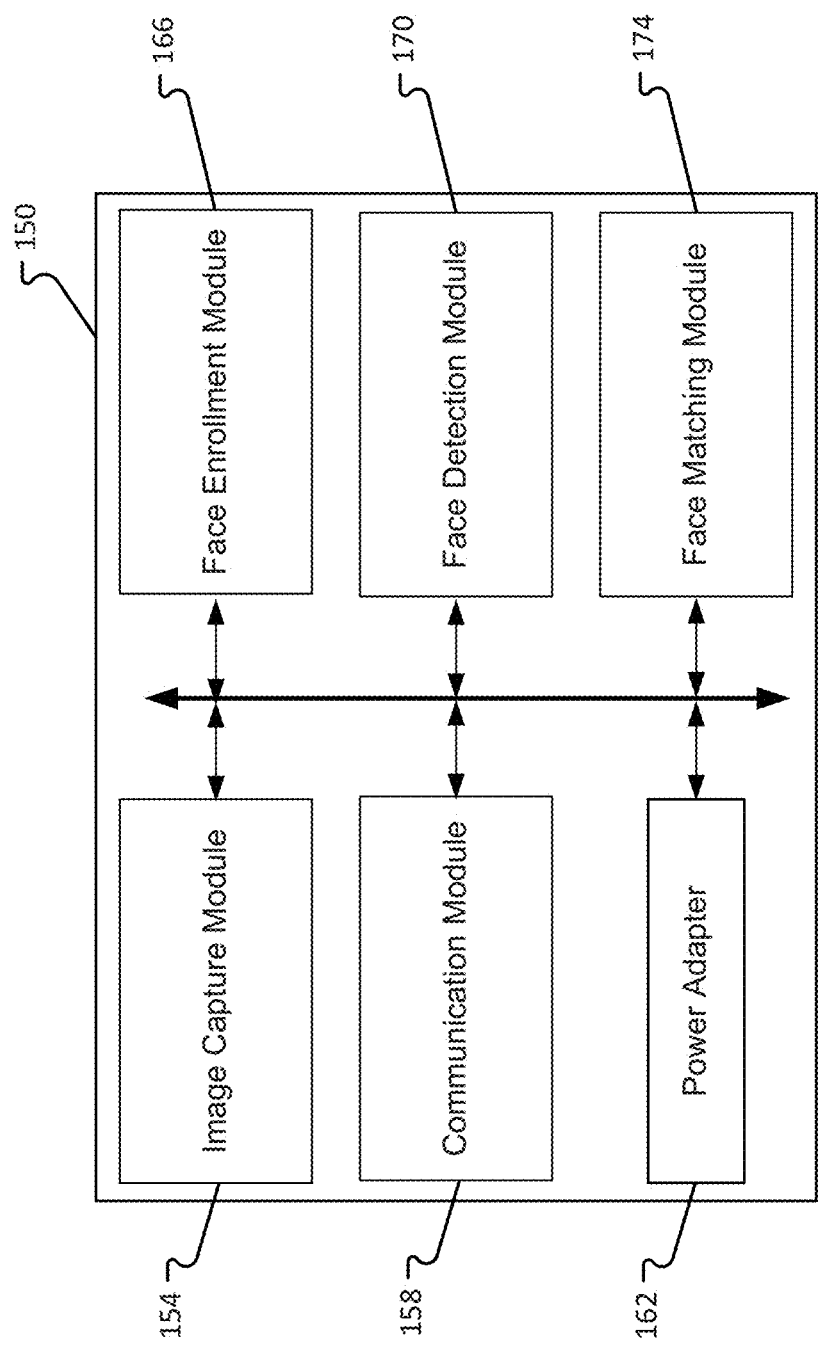
FIG. 1B shows a block diagram of a system in accordance with some embodiments.

Turning to FIG. 1B, a face recognition device 150 according to another embodiment of the present disclosure may utilize one or more application-specific integrated circuits, rather than a processor that executes instructions from multiple units. Such application-specific integrated circuits may be combined with appropriate hardware to form one or more modules for carrying out specific tasks. For example, the face recognition device 150 comprises an image capture module 154, a communication module 158, a power adapter 162, a face enrollment module 166, a face detection module 170, and a face matching module 174.

The image capture module 154 may comprise an image capture device (e.g. a camera or video camera or other image capture device), which may use any known or available image capture technology (including CMOS and/or CCD sensors). Other sensors, such as those described in connection with the image capture device 108 described above, may also be included in the image capture module 154.

The image capture module 154 may further comprise a processor controlling operation of the image capture module and one or more memory blocks for storing information, such as instructions for execution by the processor, firmware for operating the image capture device, and images captured by the image capture device. The image capture device may be large or small in size. For example, in some embodiments, the image capture module may be sufficiently small to be placed in a normally-sized writing utensil, or otherwise placed to avoid ready detection. In other embodiments, the image capture module may be mounted on a wall or ceiling and readily visible. Also in some embodiments, the image capture module 154 may be utilized for purposes other than those of the face recognition device 150. For example, a smartphone may comprise an image capture module 154 that may be used to take and store photos and/or videos as well as for face recognition purposes as described herein.

The image capture module 154 may be configured to continuously provide time-stamped image frame sequences to one or more of the face enrollment module 166, face detection module 170, and/or face matching module 174. Alternatively, the image capture module 154 may be configured to provide a time-stamped image frame sequence to one or more of the face enrollment module 166, the face detection module 170, and/or the face matching module 174 upon receipt of a command from a central administrator (e.g. via the communication module 158) or from one or more of the modules 166, 170, and 174. In some embodiments, the image capture module 154 may periodically send an image to one or more of the modules 166, 170, and 174, and may receive in response a command to obtain and provide a time-stamped image frame sequence to one or more of the modules 166, 170, 174.

The communication module 158 may comprise one or more wired communication ports and/or a wireless communication radio and associated antenna. The communication module 158 may be configured to communicate over a wired communication port using, for example, a protocol such as RS-232, RS-422, RS-485, I2C, SPI, IEEE 802.3, or TCP/IP. In embodiments having a wireless communication radio, the wireless communication radio may be configured to communicate using any known wireless communication standard, including, for example, IEEE 802.11a/b/g/n, Bluetooth, Bluetooth Low Energy (BLE), FeliCa, Zigbee, GSM, LTE, 3G, 4G, 5G, RFID, and NFC. The communication module 158 may be used to send or receive information. For example, the communication module 158 may be used to receive information from remote databases containing known face images, and/or to receive firmware or software updates for any of the modules of the face recognition device 150, and/or to receive new or updated face classification rules, and/or to receive new or updated access control rules (for embodiments of the face recognition device 150 that control physical or electronic access to a protected resource, e.g. by selectively unlocking a door based on the results of a face recognition determination, or by granting a user access to an online account), and/or to transmit a face recognition determination to a central server or administrator, and/or to transmit stored images captured by the image capture module 154 for offline storage or remote review.

The power adapter 162 may be the same as or similar to the power adapter 120. The power adapter 162 provides power (e.g., electricity) to the various modules of the face recognition device 150. In some embodiments, the power adapter 162 receives a first power signal from an outside source and sends one or more second, distinct power signals (e.g., power signals obtained by transforming, conditioning, or otherwise modifying the incoming first power signal) to one or more modules of the face recognition device 150. The power adapter may comprise a battery or other energy storage unit as a primary or backup power source, and may also comprise one or more power generation units (e.g., a solar panel).

The face enrollment module 166 may comprise a processor and one or more memory blocks containing, for example, instructions for execution by the processor as well as data received from another module or from a remote database (e.g. via the communication module 158), or for transmission to another module or to a remote database (e.g. via the communication module 158). The instructions may be configured to cause the processor to receive an image captured by the image capture module 154, analyze the captured image to identify relevant features thereof (e.g. features that may be useful or necessary for face recognition purposes), and store (or cause to be stored) information about the identified features for future use or reference. The face enrollment module 166 may comprise a user interface for allowing a user to indicate when a new face is to be enrolled. The face enrollment module 166 may also comprise one or more security features (e.g. password protection, biometric protection, time-based access control, authentication requirements) to prevent unauthorized enrollment of a new face. The user interface may be or include one or more physical components (e.g. a button or a keypad) and/or one or more electronic components (e.g. for receiving commands via the wireless communication module 158 from an external computer or terminal).

In some embodiments, the face enrollment module 166 may communicate or otherwise operate in conjunction with the face detection module 170 when enrolling a new face to ensure that the face presented for enrollment is a live face, using the methods described in greater detail herein.

The face detection module 170 may also comprise a processor and one or more memory blocks containing, for example, instructions for execution by the processor as well as data received from another module or from a remote database (e.g. via the communication module 158), or data for transmission to another module or a remote database (e.g. via the communication module 158). The instructions may cause the processor to detect one or more faces in an image or image sequence received from the image capture module 154. The instructions may also cause the processor to make a face likeness determination for one or more faces detected in an image or image sequence received from the image capture module 154, using, for example, the methods described herein. The instructions may also cause the processor to transmit the results of a face detection and/or of a face likeness determination to the face recognition module 174, the face enrollment module 166, and/or to a remote recipient (e.g. a central administrator or database) via the communication module 158.

The face matching module 174, like the modules 166 and 170, may comprise a processor and one or more memory blocks containing, for example, instructions for execution by the processor as well as data received from another module or from a remote database (e.g. via the communication module 158), or data for transmission to another module or a remote database (e.g. via the communication module 158). The instructions may cause the processor to compare information from or about a detected or new face image with information from or about face images corresponding to known faces, for the purpose of determining whether the detected or new face image is an image of a known face. The instructions may also cause the processor to communicate with a remote database of known faces, and/or to communicate a face recognition determination to an access control system, and/or to a central database or repository.

Memory blocks included in the various modules of the face recognition device 150 may be any non-transient, tangible form or type of memory. For example, the memory blocks may be or comprise ROM, RAM, EEPROM, and/or flash memory.

The face recognition devices 100 and 150 are not intended to be mutually exclusive embodiments of the present disclosure. Aspects of the face recognition device 100, as described above, may be incorporated into the face recognition device 150. Similarly, aspects of the face recognition device 150, as described above, may be incorporated into the face recognition device 100. The face recognition device 100 and 150 may be stand-alone devices, such as mobile devices (including, for example, mobile phones, tablets, and laptop computers), or may comprise a plurality of separate devices in communication with each other (e.g. a computer, a camera, and a door locking mechanism). The foregoing examples are not intended to be limiting. The face recognition devices 100 and 150 may utilize some or all of the techniques discussed below to identify spoofs.

In some embodiments, a face enrollment device may comprise substantially the same components as the face recognition device 100, but may not be equipped with a face matching unit 144. In other embodiments, a face enrollment device may comprise substantially the same components as the face recognition device 150, but may not be equipped with the face matching module 174. Face enrollment devices such as these may be used for enrolling faces for use in later face recognition, but not for actual face recognition. Even so, face enrollment devices may be configured to analyze reflections of projected light in varying colors, brightness, patterns, and sequences for likeness detection, as described herein.

Figure 2A:
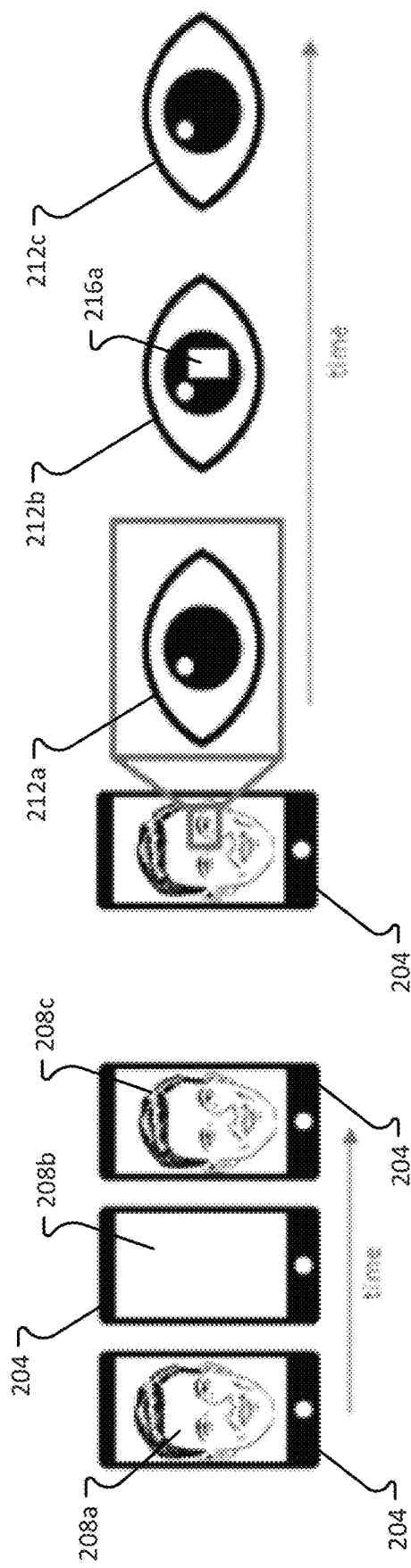
FIG. 2A shows images displayed on a mobile device during a face recognition analysis as well as detail of a portion of an image captured by a camera of the mobile device during the face recognition analysis, in accordance with some embodiments.
Figure 2B:
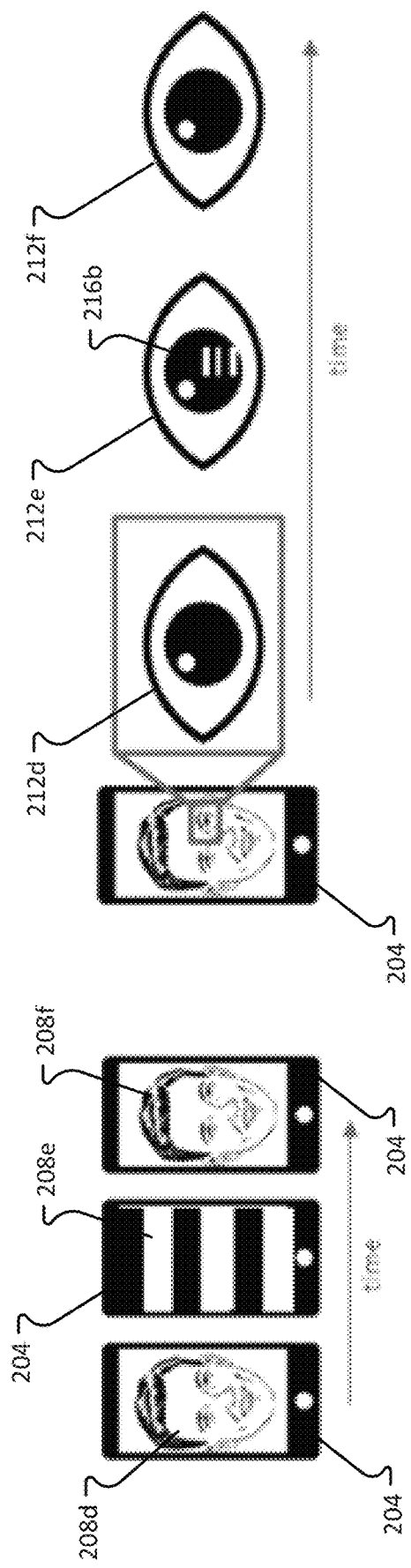
FIG. 2B shows images displayed on a mobile device during a face recognition analysis as well as detail of a portion of an image captured by a camera of the mobile device during the face recognition analysis, in accordance with some embodiments.
Figure 2C:
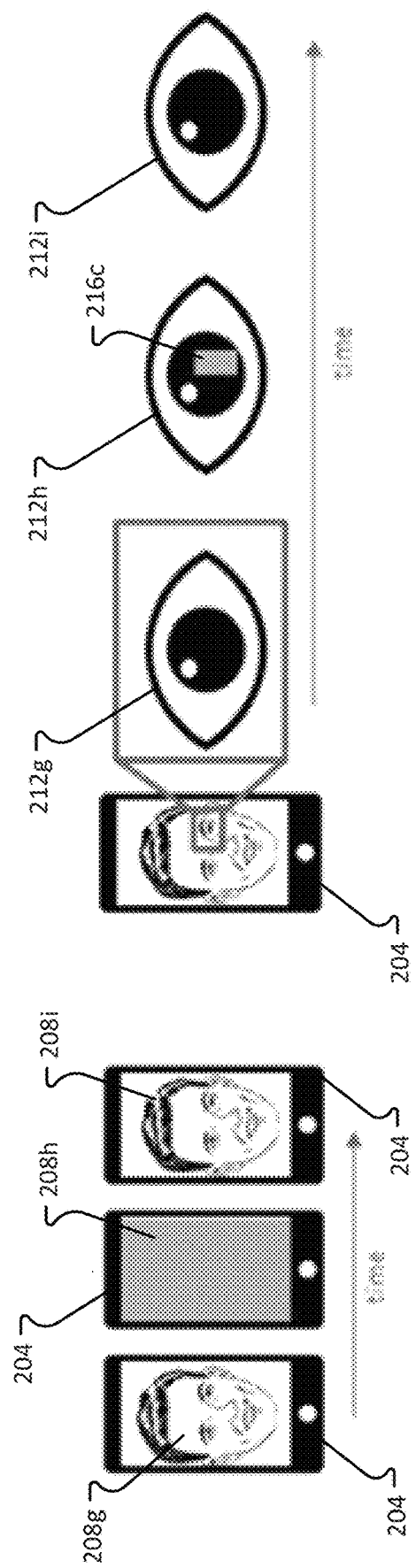
FIG. 2C shows images displayed on a mobile device during a face recognition analysis as well as detail of a portion of an image captured by a camera of the mobile device during the face recognition analysis, in accordance with some embodiments.

FIGS. 2A-2C illustrate three examples of image projection and analysis of the resulting specular reflections on the iris, all in the context of a mobile device 204 performing face enrollment and/or face recognition. The mobile device 204 may be the same as or similar to, for example, one of the face recognition devices 100 and 150, and/or may be a face enrollment device. In FIGS. 2A-2C, the mobile device 204 is generally configured to show on a screen thereof an image of the subject's face, as captured, for example, with a screen-side camera (e.g. a "selfie" camera). (In some embodiments, the mobile device 204 may be used to for face enrollment and/or face recognition of one or more individuals other than the user of the mobile device 204; in these instances, a rear-facing camera (e.g. a camera facing the opposite direction as the screen) of the mobile device 204 may be used, and the image shown on the screen of the mobile device would correspond to the individual at whom the rear-facing camera is pointed, rather than to the user of the mobile device 204.) However, the mobile device 204 temporarily displays a different image on the screen thereof during the face enrollment and/or recognition process.

More specifically, FIG. 2A shows a mobile device 204 at three sequential points in time during a face enrollment or face recognition process. At the first point in time, the mobile device 204 displays an image 208a of a face captured by a camera that is on or in communication with the mobile device 204. The face in the image 208a is the face of the subject being enrolled or recognized. At the second point in time, the mobile device 204 displays a plain white image 208b. At the third point in time, the mobile device 204 again displays an image 208c of the subject face, as captured by the camera. At each of these three points in time, regardless of what is being shown on the screen of the mobile device 204, the camera associated with the mobile device 204 is capturing still or video images of the subject face.

Also shown in FIG. 2A are close-up views of one eye from the subject face. Thus, the eye 212a is a close-up of an eye from the subject pictured in the image 208a; the eye 212b is a close-up of an eye from the subject pictured in the image 208b; and the eye 212c is a close-up of an eye from the subject pictured in the image 208c. Notably, the iris of the eye 212b contains a detectable reflection of the plain white image 208b.

Referring now to FIG. 2B, the mobile device 204 may, as an alternative to displaying a plain white image 208b as discussed with respect to FIG. 2A above, display a particular pattern 208e, while still showing the subject face at points in time before (image 208d) and after (image 208f) the point in time at which the pattern 208e is displayed. FIG. 2B also shows close-up views of one eye from the subject face, which views correspond to the images 208d, 208e, and 208f. The mobile device 204 (or, more specifically, a processor thereof being used to conduct a face recognition analysis) can identify the reflection 216b of the pattern 208e in the iris of the eye 212e, which results from the mobile device 204's display of the pattern 208e.

Relatedly, FIG. 2C shows the mobile device 204 displaying a solid color image 208h at one point in time, while displaying the subject face at points in time before (image 208g) and after (image 208i) displaying the solid color image 208h. Here again, the solid color image 208h causes a reflection 216c in the iris of the eye 212h of the subject face.

Although FIGS. 2A, 2B, and 2C depict the subject face being shown on mobile device 204 before and after the solid white image 208b, the pattern 208e, and the solid color image 208h are displayed, respectively, embodiments of the present disclosure may or may not show the subject face on a screen of the device conducting the analysis, be it a mobile device 204, or any other device 100 or 150. Additionally, to ensure that the reflections 216a, 216b, and 216c are detectable, the mobile device 204 (or other device used to display or project an image or pattern for reflection by an individual's eye) may adjust the brightness of a screen or projector thereof. The brightness may be adjusted automatically every time an image for reflection is displayed, or the brightness may be adjusted automatically based on detected levels of light. The latter alternative may be particularly useful when the face enrollment or recognition system is used at different times of day, including in daylight and at night. Additionally, the image selected for display or projection (e.g. the image 208b, 208e, or 208h) by a particular face enrollment or recognition system may always be the same, or it may change according to a particular rotation, or it may change randomly. In still other embodiments, the image selected for display or projection may be based upon, for example, whether a reflection of the available images will be more or less readily detectable given one or more current environmental conditions (e.g. time of day, detected light, movement or vibration of the mobile device 204 or other face recognition system (or camera thereof)). By way of illustration but not limitation, a reflection of a solid white image (e.g. the reflection 216*a*) may be more readily detectable than a reflection of a particularly pattern (e.g. the reflection 216*b*) when the mobile device 204 is being held by a person and is therefore not completely still. As another example, a reflection of a particular color (e.g. for a solid color image such as the image 208*h*) may be more readily detectable in daylight or direct sunlight, while a reflection of a different color may be more readily detectable in fluorescent light or at night. Further still, in some embodiments, the mobile device 204 may conduct a preliminary analysis of an eye of a face being analyzed to determine whether there are any preexisting reflections in the eye, and, if so, the mobile device 204 may display a solid color image such as the image 208*h* that has a color not already present in the existing reflections detected in the eye. Alternatively, the mobile device 204 may note the location or other characteristics of existing reflections in the eye, and exclude those reflections from consideration when analyzing the eye to identify the intended reflection.

FIGS. 3A and 3B show actual images of a subject's right eye (FIG. 3A) and left eye (FIG. 3B) before, during, and after a device such as the mobile device 204, or another face recognition device 100 or 150 or face enrollment device displays or projects a solid white image toward the subject's eyes. In FIG. 3A, image 304*a* shows the subject's right eye before the solid white image is displayed or projected, image 304*b* shows the subject's right eye while the solid white image is displayed or projected, and image 304*c* shows the subject's right eye after the solid white image is displayed or projected. As shown in image 304*b*, the iris of the subject's right eye includes a reflection 308*a* of the solid white image while the solid white image is displayed or projected by the mobile device 204 or other face recognition device 100 or 150 or face enrollment device.

Similarly, in FIG. 3B, image 312*a* shows the subject's left eye before the solid white image is displayed or projected, image 312*b* shows the subject's left eye while the solid white image is displayed or projected, and image 312*c* shows the subject's left eye after the solid white image is displayed or projected. As shown in image 312*b*, the iris of the subject's left eye includes a reflection 308*b* of the solid white image while the solid white image is displayed or projected by the mobile device 204 or other face recognition device 100 or 150 or face enrollment device.

The eyes of a face printed on a piece of paper or displayed on a screen (i.e. of a spoof face) would not reflect the solid white image as do the eyes of a live subject, as shown in FIGS. 3A and 3B. Consequently, by detecting a reflection 308*a* or 308*b* in the eye or eyes of a subject, a mobile device 204 or other face recognition system 100 or 150 or face enrollment device can determine likeness with a relatively high degree of confidence.

Detected reflections are not limited to reflections off a subject's face or portions thereof, but also can be reflections off of other reflective surfaces worn on the face, such as glasses. In these cases, reflections off such reflective surfaces can be detected and used as supporting evidence in lieu of, or in addition to, reflections off the eye. An example with glasses is shown in FIGS. 4A and 4B. The images 404*a*, 404*b*, and 404*c* in FIG. 4A are of the right eye of a live subject before, during, and after a mobile device 204 or other face recognition device 100 or 150 or face enrollment device displays or projects a solid white image. The images 416*a*, 416*b*, and 416*c* in FIG. 4B are of the left eye of the live face before, during, and after the device displays or projects a solid white image. In image 404*b*, the glasses being worn on the live face show a reflection 408*a* of the solid white image, while the eye of the live face shows a reflection 412*a* of the solid white image. Similarly, in image 416*b*, the glasses being worn on the live face show a reflection 408*b* of the solid white image, while the eye of the live face shows a reflection 412*b* of the solid white image. The presence of the reflections 408*a,b*, and/or of the reflections 412*a,b*, can beneficially be used as supporting evidence for a likeness determination.

In addition to the embodiments described above, in another embodiment a mobile device 204 or other face recognition device or system 100 or 150 or face enrollment device may display or cause to be displayed on a screen associated with the device or system (or project or cause to be projected directly onto one or more subject faces) images of various brightness and colors on the device screen in different time sequences. These projections might vary based on environmental conditions, such as bright light or darkness. The images are projected onto the face of the user (whether directly or by virtue of being displayed on the device screen, perhaps with a high brightness setting), and pictures or video of the face with the projected images are captured and analyzed. The resulting analyses are used to determine the likelihood that the subject is a live, three-dimensional person or an attempted spoof, such as a paper-based photo, digital photo, or digital video of the subject. For example, for a live image the face region will tend to reflect the projected color or brightness pattern, but the background will not. The resulting image will be, therefore, quite different if the subject is a spoof attempt using a paper photo or digitally displayed photo or video.

Figure 5:
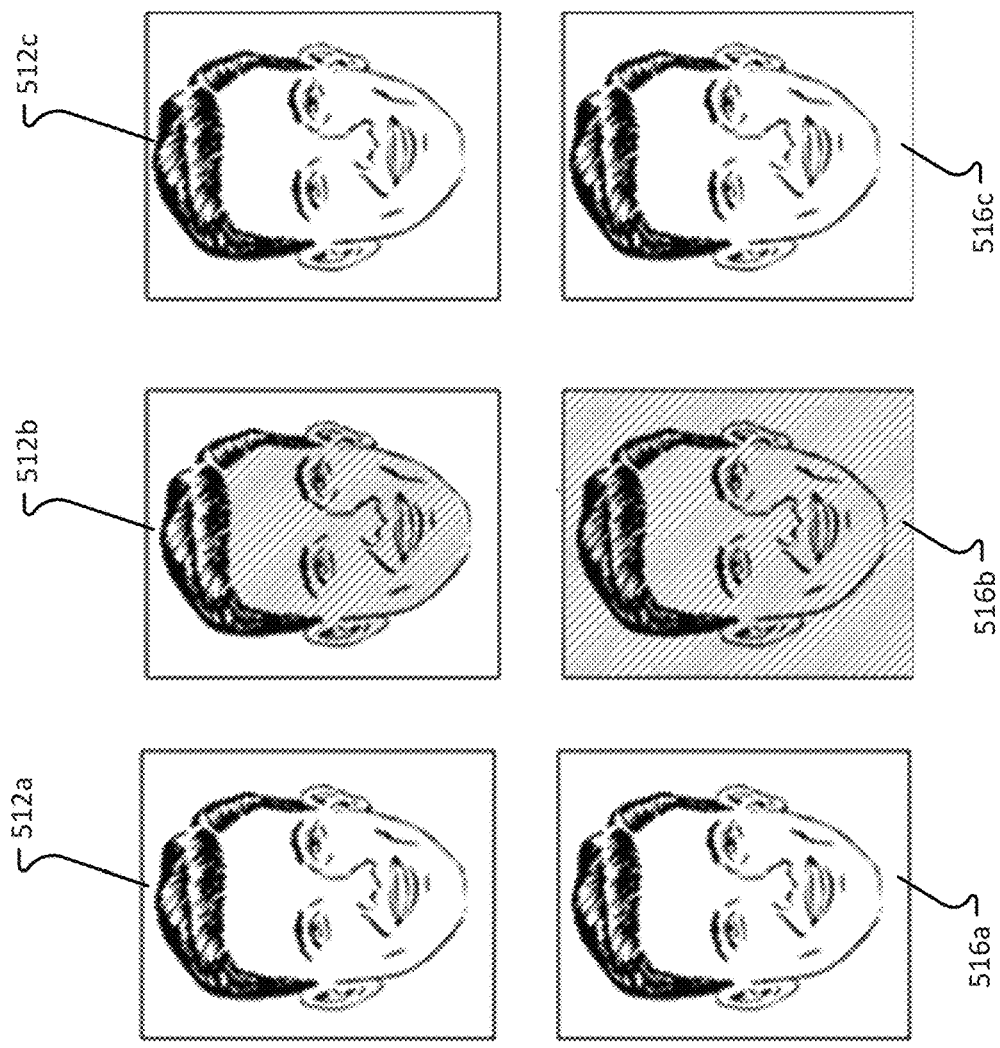
FIG. 5 shows images displayed on a mobile device during a face recognition analysis as well as corresponding images of a live face and of a spoofed face captured by a camera of the mobile device during the face recognition analysis, in accordance with some embodiments.
Figure 5:
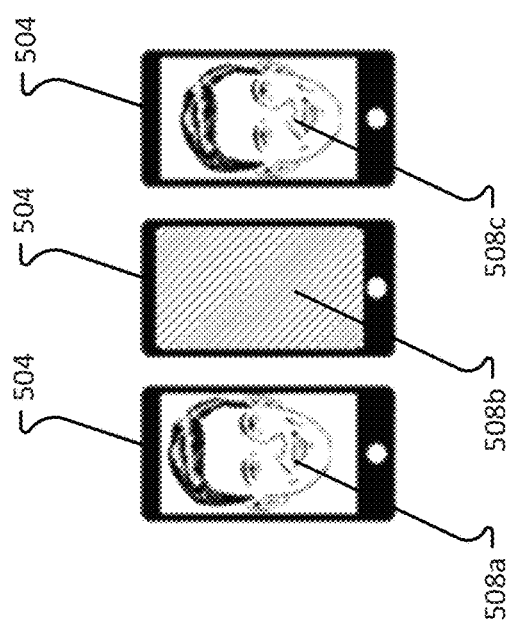

For example, FIG. 5 shows a mobile device 504 that may be identical or substantially similar to the mobile device 204, and/or to another face recognition system 100 and/or 150, and/or to a face enrollment device. The mobile device 504 is configured to perform face enrollment and/or face recognition analyses, and in FIG. 5 is shown during a face enrollment or face recognition analysis of a particular subject. During the face enrollment or face recognition analysis, the mobile device 504 displays an image 508*a* of the subject at a first point in time, which image may be or correspond to an image of the subject captured by a camera of or associated with the mobile device 504. At a second, later point in time, the mobile device 504 displays a colored pattern 508*b*, and at a third point in time after the second point in time, the mobile device 504 again displays an image 508*c* of the subject. It should be appreciated that although the mobile device 504 is depicted in FIG. 5 as displaying images 508*a* and 508*c* of the subject, the face enrollment or face recognition analysis performed by the mobile device 504 is not dependent on the display of pictures of the subject such as images 508*a* and 508*c*, and in some embodiments the mobile device 504 may not display pictures of the subject before and/or after displaying the colored pattern 508*b*.

With reference still to FIG. 5, images 512*a*, 512*b*, and 512*c* depict images of a live subject such as might be captured by a camera of, or that is associated with, the mobile device 504. The images 512*a*, 512*b*, and 512*c* may be captured at times corresponding to the times at which the images 508*a*, 508*b*, and 508*c* are displayed on the screen of the mobile device 504. In image 512*a*, the subject face is unaltered. In image 512*b*, the subject face (but not the background of the image) reflects the colored pattern 508*b* displayed by the mobile device 504. In image 512c, the subject face is again unaltered, as the mobile device 504 is no longer displaying the pattern 508b.

Images 516a, 516b, and 516c, on the other hand, depict images of a spoof face such as might be captured by a camera of, or that is associated with, the mobile device 504. The images 516a, 516b, and 516c may be captured at times corresponding to the times at which the images 508a, 508b, and 508c are displayed on the screen of the mobile device 504. In images 512a and 512c, the spoof face is unaltered. In image 516b, the spoof face and the background of the image reflect the colored pattern 508b displayed by the mobile device 504. Because the background of a live face would not reflect the image 508b, the face recognition analysis conducted by the mobile device 504 can determine with a relatively high degree of confidence that the subject of the images 516a, 516b, and 516c is a spoof.

Having described systems for determining face likeness during face enrollment or face recognition according to embodiments of the present disclosure as well as various techniques for implementing the present disclosure, a method 600 according to embodiments of the present disclosure will now be described with reference to FIG. 6.

Figure 6:
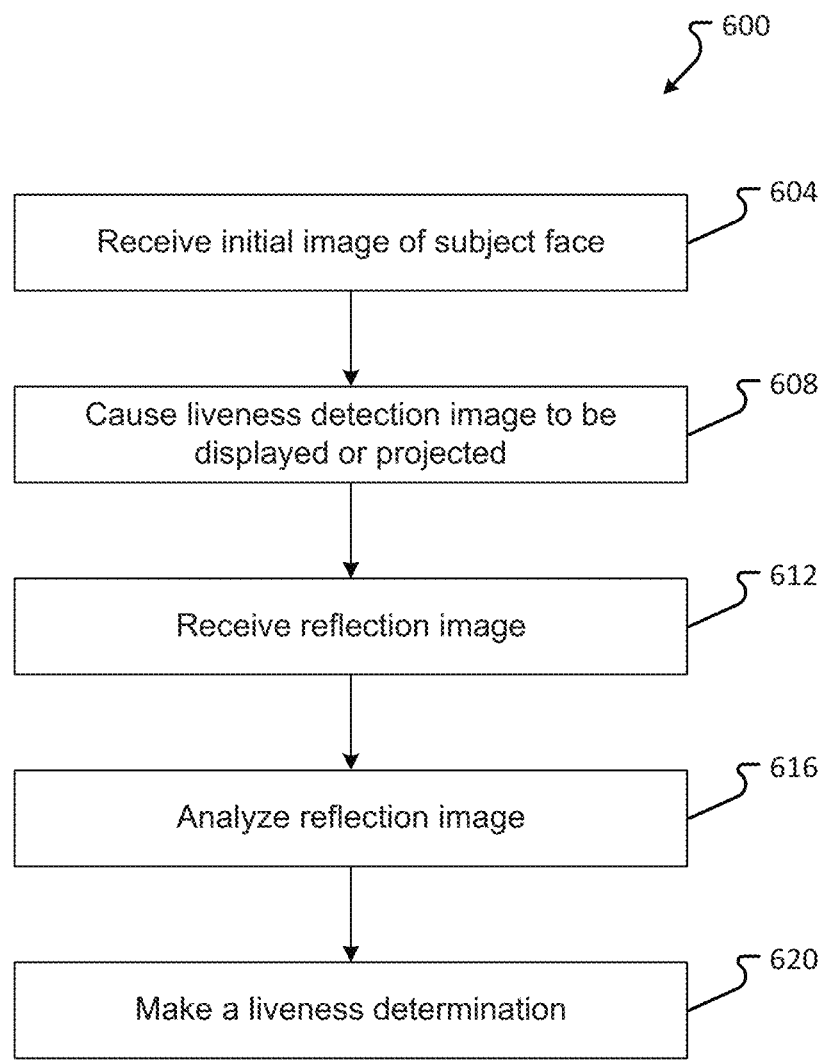
FIG. 6 is a flowchart of a method of face likeness detection in accordance with some embodiments.

The method 600 shown in FIG. 6 begins with the receipt, at a processor of a mobile device 204 or 504 or of another face recognition system 100 or 150 or face enrollment device, and from a camera utilized by the device or system, of an initial image of a subject face that has been presented for face enrollment or face recognition (step 604). The camera may be configured to capture an initial image of the subject face upon the command of an operator of the camera, which operator may ensure that the camera is properly aligned to capture the initial image of the subject face. Alternatively, the camera may be configured to capture an initial image in response to detection, by a motion detector or other motion sensor in electronic communication with the camera, of movement within the camera's field of view. In still other embodiments, the camera may be configured to continuously capture images, which images may subsequently be analyzed to determine whether there are any faces in the image suitable for face enrollment or face recognition. In some embodiments, the camera and the associated mobile device 204 or 504 or other face recognition system 100 or 150 or face enrollment device may be configured to analyze one face at a time, while in other embodiments the camera may be configured to capture images of a plurality of subjects, and the device or system may be configured to simultaneously analyze each of the subject faces in the image. Also in some embodiments, the mobile device 204 or 504 or other face recognition system 100 or 150 or face enrollment device may be a stand-alone device, such as a mobile phone, tablet, or laptop, while in other embodiments, the device or system may comprise a plurality of components in electronic communication with each other, which components may be physically adjacent to each other and connected via a local area network, or distributed across a wider area and connected to each other via a wide area network.

The method 600 also comprises causing at least one likeness detection image to be displayed or projected, toward the subject face (step 608). The at least one likeness detection image may be a solid white image, a solid color image, a patterned black and white image, or a patterned color image. The at least one likeness detection image may comprise one or more shapes or other features. Where a plurality of likeness detection images are displayed, each likeness detection image from the plurality of likeness detection images may be different than the other likeness detection images in the plurality of likeness detection images. In other embodiments, at least one of the plurality of likeness detection images may be different from at least one other of the plurality of likeness detection images.

The at least one likeness detection image of step 608 may, in some embodiments, be displayed on a display screen of the device or system being used in the method 600. In such embodiments, a processor of the device or system may cause a brightness of the display screen to be increased so that the display screen radiates more light toward the subject, so as to result in a stronger or more readily detectable reflection. The brightness of the display screen may be automatically set based upon detected environmental conditions as well. For example, a light sensor associated with the device or system may detect that the ambient light level is low, as a result of which the processor of the device or system may cause the at least one image to be displayed at a lower brightness than, for example, if the ambient light level were high (as it would be, for example, if the subject were standing in direct sunlight).

In other embodiments, the at least one likeness detection image may be projected toward the subject(s) rather than simply being displayed on a mobile device. In such embodiments, the device or system being used in the method 600 comprises a projector separate from the camera. The projector may be configured to project images onto the area within the field of view of the camera, so that any faces that may be visible in an image captured by the camera would also be in position to reflect a likeness detection image projected by the projector. The field of view of the camera—and the field of projection of the projector—may be sized to capture images of or project likeness detection images on, respectively, only one person at a time, or a plurality of people at a time. As with embodiments in which a camera is used to display the at least one likeness detection image, one or more settings of the projector may be adjusted to account for environmental conditions, such as the level of ambient light.

Also in the method 600, a processor of the device or system being used in the method 600 receives at least one reflection image of the subject captured while the at least one likeness detection image was being displayed or projected (step 612). Where a plurality of likeness detection images were displayed or projected, device or system receives at least one reflection image of the subject captured while each of the plurality of likeness detection images that were displayed or projected. The at least one reflection image received in step 612 is received from the camera utilized by the device or system being used in the method 600.

The processor of the device or system analyzes the at least one reflection image to determine the extent of any reflection contained therein (step 616). The analysis may, in some embodiments, comprise a comparison of the initial image with the reflection image, which comparison may be used, in some embodiments, to identify portions of the reflection image that differ from similar portions of the initial image. For example, such a comparison may lead to identification of the eyes of the subject face as being different in the reflection image than in the initial image. Where a spoof face is being presented to the device or system being used in the method 600, the background of the reflection image may be identified as being different than in the original image, or, in some instances, no portion of the reflection image may be identified as being different from the original image.

In other embodiments, the analysis of the reflection image may comprise dividing the reflection image into zones (e.g.

an eye zone, a face zone, and a background zone). Each zone may then be analyzed to determine whether the zone includes any evidence of a reflection of the likeness detection image. For example, where the likeness detection image was a solid white image, the eye zone may be analyzed to determine whether there is a bright spot on the iris of the eye. Where glasses are detected in the eye zone, the eye zone may be analyzed to determine whether there is a reflection of the solid white image on the glasses, in addition to or instead of determining whether there is a reflection of the solid white image on the iris of the eye. Similar analyses may be conducted for the face zone and the background zone.

Once the analysis is complete, the processor of the device or system being used in the method 600 determines, based on the analysis, whether the subject is live or not (step 620). For example, if in step 616 reflections of the at least one likeness detection image were identified in the eyes and on the face of the subject, but not in the background of the reflection image, then the processor may make a determination that the subject is live. Alternatively, where the entirety of the reflection image contains a reflection of the likeness detection image, or where none of the reflection image contains a reflection of the likeness detection image, or even where the reflection image contains a reflection of the likeness detection image but the reflection is continuous across a portion of the subject face and a portion of the background (thus suggesting that the subject face and the background are in the same plane), the processor may make a determination that the subject is spoofed.

In some embodiments, the processor of the device or system being used in the method 600 may be configured to repeat steps 608 through 620 if, during the first iteration of step 620, the processor is unable to determine whether the subject face is live or spoofed. In such embodiments, the processor may be configured to cause a different likeness detection image to be displayed or projected in step 612, or to cause a different series or sequence of likeness detection images to be displayed or projected in step 612. The processor may further be configured to cause steps 608 through 620 to be repeated a predetermined maximum number of times, after which, if no likeness determination can yet be made, the processor defaults to a predetermined result (e.g., a determination that the subject face is spoofed, or a determination that the subject face is live).

The various embodiments and variations thereof illustrated in the accompanying figures and throughout this document are given by way of example and are not meant to limit the scope of the invention.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like.

Exemplary aspects are directed toward:
A method of determining face likeness, comprising:
causing, with a processor of a face recognition device, a likeness detection image to be displayed on a screen of the face recognition device during a first period of time;
receiving, at the processor, a reflection image from a camera utilized by the face recognition device, the reflection image captured during the first period of time and showing a subject face;
analyzing, with the processor, the reflection image to identify any reflections of the likeness detection image in the reflection image; and
making, with the processor, a likeness determination based on the analysis.

Any of the aspects herein, further comprising receiving, at the processor, an initial image of the subject face, the initial image captured during a period of time preceding the first period of time.

Any of the aspects herein, wherein the analyzing comprises: comparing the reflection image to the initial image; and identifying portions of the reflection image that are different than the initial image.

Any of the aspects herein, wherein the analyzing comprises: dividing the reflection image into a plurality of zones; and determining whether a reflection of the likeness detection image appears in each of the plurality of zones.

Any of the aspects herein, wherein the likeness detection image is a solid white image.

Any of the aspects herein, wherein the likeness detection image is a patterned image.

Any of the aspects herein, wherein the likeness detection image is a colored image.

Any of the aspects herein, further comprising: receiving information about a light level from a light meter utilized by the face recognition device; and causing, with the processor, a brightness of the screen to be adjusted based on the received information.

Any of the aspects herein, further comprising:
causing, with the processor of the face recognition device, a plurality of likeness detection images to be displayed on the screen of the face recognition device during the first period of time;
receiving, at the processor, a plurality of reflection images from the camera utilized by the face recognition device, the plurality of reflection images captured during the first period of time, each of the plurality of reflection images captured while a different one of the plurality of likeness detection images was caused to be displayed on the screen of the face recognition device;
analyzing, with the processor, each of the plurality of reflection images to identify any reflections of the likeness detection image in each of the plurality of reflection images; and
making, with the processor, a likeness determination based on the analysis.

Any of the aspects herein, wherein at least one of the plurality of likeness detection images is different than at least another one of the plurality of likeness detection images.

A face recognition device, comprising:
a camera;
a display screen;
processor; and
a memory storing instructions for execution by the processor that, when executed by the processor, cause the processor to:
cause a likeness detection image to be displayed on the display screen;
cause the camera to capture a reflection image of a subject face while the likeness detection image is displayed on the display screen;
analyze the reflection image to identify one or more reflections of the likeness detection image in the reflection image; and
make a likeness determination based on the analysis.

Any of the aspects herein, further comprising:
causing a plurality of likeness detection images to be displayed on the display screen in sequence;
causing the camera to capture at least one reflection image of the subject face while each of the plurality of likeness detection images is displayed on the display screen; and
analyzing each reflection image to identify one or more reflections of one of the plurality of likeness detection images therein.

Any of the aspects herein, wherein the memory stores additional instructions that, when executed, further cause the processor to:
determine that the subject face is live if the only reflection of the likeness detection image is in the iris of each eye of the subject face; and
determine that the subject face is spoofed if a background of the subject face in the reflection image contains a reflection of the likeness detection image.

Any of the aspects herein, wherein the face recognition device is a mobile device.

Any of the aspects herein, wherein the likeness detection image is one of a solid white image, a patterned image, and a colored image.

Any of the aspects herein, wherein the memory stores additional instructions for execution by the processor that, when executed by the processor, cause a brightness of the display screen to be adjusted based on a detected light level.

Any of the aspects herein, wherein analyzing the reflection image to identify one or more reflections of the likeness detection image in the reflection image comprises:
determining whether the subject face in the reflection image is wearing eyeglasses, and, if so, determining whether there is a reflection of the likeness detection image on the eyeglasses in the reflection image.

A method for determining whether a face is live or spoofed, comprising:
projecting a likeness detection image onto a subject face during a first time period;
capturing a reflection image of the subject face during the first time period;
identifying at least one reflection of the likeness detection image in the reflection image;
determining a location in the reflection image, relative to the subject face, of the at least one reflection; and
based on the determined location, making a likeness determination.

Any of the aspects herein, wherein the making a likeness determination further comprises:
determining that the subject face is spoofed if the determined location comprises a background of the subject face in the reflection image.

Any of the aspects herein, wherein the likeness detection image is one of a solid white image, a black and white patterned image, a solid colored image, and a colored patterned image.

Any one or more of the aspects as substantially described herein.

One or more means adapted to perform any one or more of the above aspects.

Any non-transitory computer readable information storage medium that stores instructions for performing any one or more of the above aspects.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein may show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a communications network. As will be appreciated from the description, and for reasons of computational efficiency, the components of the system can be arranged at any location within a distributed network without affecting the operation of the system.

Furthermore, it should be appreciated that the various links, including communications channel(s), connecting the elements (which may not be not shown) can be wired or wireless links, or any combination thereof, or any other known or later developed element(s) that is/are capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts/operational flows have been discussed in relation to a particular exemplary sequence of events, it should be appreciated that changes to this sequence can occur without materially effecting the operation of the embodiment(s). Additionally, the exact sequence of events need not occur as set forth in the exemplary embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable.

As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

A computer readable medium as described herein may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C#, Pascal, JAVA, JAVA Script, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's/operator's/administrator's computer, partly on such a computer, as a stand-alone software package, partly on the user's/operator's/administrator's computer and partly on a remote computer, or entirely on a remote computer or server. Any such remote computer may be connected to the user's/operator's/administrator's computer through any type of network, including a local area network (LAN) or a wide area network (WAN), or the connection may be made to an external computer (for example, through the Internet using an Internet Service Provider).

Additionally, the systems, methods and protocols described herein can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein include, but are not limited to, at least one of Qualcomm® Snapdragon® 800 and 801, Qualcomm® Snapdragon® 610 and 615 with 4G LTE Integration and 64-bit computing, Apple® A7, A8, A8X, A9, A9X, or A10 processors with 64-bit architecture, Apple® M7, M8, M9, or M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer, workstation or mobile device platforms. Alternatively, the disclosed system may be implemented partially in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, mobile device, smartphone, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

The invention claimed is:

1. A method of determining face liveness, comprising:
during both an enrollment phase and a face recognition phase:
automatically detecting, by a mobile device, a level of light;
displaying a captured image of a subject's face on a screen;
conducting a preliminary analysis of an eye of the subject's face to determine whether there are any preexisting reflections in the eye;
selecting a liveness detection image based upon whether a reflection of the image will be more or less readily detectable given one or more current environmental condition;
causing, with a processor of the mobile device, the liveness detection image to be displayed on the screen of the mobile device during a first period of time, the displayed liveness detection image brightness adjusted based on the detected level of light;

receiving, at the processor, a reflection image from a camera utilized by the mobile device, the reflection image captured during the first period of time and showing the subject's face;

displaying the captured image of a subject's face or another captured image of the subject's face on the screen;

analyzing, with the processor, the reflection image to identify any reflections of the liveness detection image in the reflection image; making, with the processor, a liveness determination based on the analysis;

selecting one captured image determined to be live; and storing the one captured image determined to be live; and normalizing the one captured image.

2. The method of determining face liveness of claim 1, further comprising receiving, at the processor, an initial image of the subject face, the initial image captured during a period of time preceding the first period of time.

3. The method of determining face liveness of claim 2, wherein the analyzing comprises:
comparing the reflection image to the initial image; and identifying portions of the reflection image that are different than the initial image.

4. The method of determining face liveness of claim 1, wherein the analyzing comprises:
dividing the reflection image into a plurality of zones; and
determining whether a reflection of the liveness detection image appears in each of the plurality of zones.

5. The method of claim 1, wherein the liveness detection image is a solid white image.

6. The method of claim 1, wherein the liveness detection image is a patterned image.

7. The method of claim 1, wherein the liveness detection image is a colored image.

8. The method of claim 1, further comprising:
receiving information about a light level from a light meter utilized by the mobile device; and
causing, with the processor, a brightness of the screen to be adjusted based on the received information.

9. The method of claim 1, further comprising:
causing, with the processor of the mobile device, a plurality of liveness detection images to be displayed on the screen of the mobile device during the first period of time;
receiving, at the processor, a plurality of reflection images from the camera utilized by the mobile device; the plurality of reflection images captured during the first period of time, each of the plurality of reflection images captured while a different one of the plurality of liveness detection images was caused to be displayed on the screen of the mobile device;
analyzing, with the processor, each of the plurality of reflection images to identify any reflections of the liveness detection image in each of the plurality of reflection images; and
making, with the processor, a liveness determination based on the analysis.

10. The method of claim 9, wherein at least one of the plurality of liveness detection images is different than at least another one of the plurality of liveness detection images.

11. A face enrollment or face recognition device, comprising:
a camera;
a display screen;
a processor;
and a memory storing instructions for execution by the processor that, when executed by the processor, cause the processor, for both an enrollment phase and a face recognition phase, to:
display a captured image of a subject's face on the display screen;
automatically detect a level of light; conduct a preliminary analysis of an eye of the subject's face to determine whether there are any preexisting reflections in the eye;
selecting a liveness detection image based upon whether a reflection of the image will be more or less readily detectable given one or more current environmental condition;
cause the liveness detection image to be displayed on the display screen the displayed liveness detection image brightness adjusted based on the detected level of light;
cause the camera to capture a reflection image of a subject face while the liveness detection image is displayed on the display screen;
display the captured image of a subject's face or another captured image of the subject's face on the display screen;
analyze the reflection image to identify one or more reflections of the liveness detection image in the reflection image;
make a liveness determination based on the analysis;
select one captured image determined to be live; and
normalize the one captured image.

12. The face enrollment or face recognition device of claim 11, further comprising:
causing a plurality of liveness detection images to be displayed on the display screen in sequence;
causing the camera to capture at least one reflection image of the subject face while each of the plurality of liveness detection images is displayed on the display screen; and
analyzing each reflection image to identify one or more reflections of one of the plurality of liveness detection images therein.

13. The face enrollment or face recognition device of claim 11, wherein the memory stores additional instructions that, when executed, further cause the processor to:
determine that the subject face is live if the only reflection of the liveness detection image is in the iris of each eye of the subject face; and
determine that the subject face is spoofed if a background of the subject face in the reflection image contains a reflection of the liveness detection image.

14. The face enrollment or face recognition device of claim 11, wherein the face recognition device is a mobile device.

15. The face enrollment or face recognition device of claim 11, wherein the liveness detection image is one of a solid white image, a patterned image, and a colored image.

16. The face enrollment or face recognition device of claim 11, wherein the memory stores additional instructions for execution by the processor that, when executed by the processor, cause a brightness of the display screen to be adjusted based on a detected light level.

17. The face enrollment or face recognition device of claim 11, wherein analyzing the reflection image to identify one or more reflections of the liveness detection image in the reflection image comprises:
determining whether the subject face in the reflection image is wearing eyeglasses, and, if so, determining whether there is a reflection of the liveness detection image on the eyeglasses in the reflection image.

18. A method for determining whether a subject face is live or spoofed, for both an enrollment process and face recognition process, comprising:
   conducting, for both the enrollment process and the face recognition process, a preliminary analysis of an eye of the subject face to determine whether there are any preexisting reflections in an eye;
   selecting, for both the enrollment process and the face recognition process, a liveness detection image based upon whether a reflection of the image will be more or less readily detectable given one or more current environmental condition;
   projecting, for both the enrollment process and the face recognition process, the liveness detection image onto a subject face during a first time period;
   capturing, for both the enrollment process and the face recognition process, a reflection image of the subject face during the first time period;
   identifying, for both the enrollment process and the face recognition process, at least one reflection of the liveness detection image in the reflection image;
   determining, for both the enrollment process and the face recognition process, a location in the reflection image, relative to the subject face, of the at least one reflection;
   based on the determined location, making a liveness determination, for both the enrollment process and the face recognition process;
   selecting, for both the enrollment process and the face recognition process, one captured image determined to be live;
   normalizing, for both the enrollment process and the face recognition process, the one captured image; and
   storing, for both the enrollment process and the face recognition process, the one captured image.

19. The method of claim 18, wherein the making a liveness determination further comprises:
   determining that the subject face is spoofed if the determined location comprises a background of the subject face in the reflection image.

20. The method of claim 18, wherein the liveness detection image is one of a solid white image, a black and white patterned image, a solid colored image, and a colored patterned image.

21. The method of determining face liveness of claim 1, further comprising excluding the preexisting reflections from consideration when analyzing the eye to identify the reflection image.

22. The face enrollment or face recognition device of claim 11, further comprising excluding the preexisting reflections from consideration when analyzing the eye to identify the reflection image.

23. The method of claim 18, further comprising excluding the preexisting reflections from consideration when analyzing the eye to identify the reflection image.

* * * * *